US006498922B1

(12) United States Patent
Lazaris-Brunner et al.

(10) Patent No.: US 6,498,922 B1
(45) **Date of Patent: *Dec. 24, 2002**

(54) REGIONAL PROGRAMMING IN A DIRECT BROADCAST SATELLITE

(75) Inventors: Ken Lazaris-Brunner, Burlington (CA); Gary Beauchamp, Cambridge (CA); Bharat Tailor, Kitchener (CA)

(73) Assignee: Com Dev Limited, Cambridge (CA)

( * ) Notice: Subject to any disclaimer, the term of this patent is extended or adjusted under 35 U.S.C. 154(b) by 0 days.

This patent is subject to a terminal disclaimer.

(21) Appl. No.: 09/378,672

(22) Filed: Aug. 20, 1999

Related U.S. Application Data

(62) Division of application No. 08/935,079, filed on Sep. 5, 1997, now Pat. No. 6,047,162.

(51) Int. Cl.[7] ................................................ H04B 7/185

(52) U.S. Cl. ........................................ 455/12.1; 455/20

(58) Field of Search .............................. 455/12.1, 13.1, 455/3.01, 3.02, 427, 428, 430, 15, 17, 20, 22, 23; 370/307, 310, 315, 316

(56) References Cited

U.S. PATENT DOCUMENTS

| | | | |
|---|---|---|---|
| 3,548,108 | A | 12/1970 | Yamato et al. |
| 3,636,452 | A | 1/1972 | Nuding |
| 4,029,902 | A | 6/1977 | Bell, Jr. et al. |

(List continued on next page.)

FOREIGN PATENT DOCUMENTS

| | | |
|---|---|---|
| CA | 1084183 | 8/1980 |
| CA | 2066712 | 5/1991 |
| CA | 2068875 | 5/1991 |
| CA | 2073336 | 9/1991 |
| CA | 2061090 | 9/1992 |
| CA | 2087542 | 11/1992 |
| CA | 2089043 | 9/1993 |
| CA | 2114851 | 12/1993 |
| CA | 2125371 | 1/1995 |
| CA | 2154123 | 1/1996 |

OTHER PUBLICATIONS

"The Application of Surface Acoustic Wave Filters to Communications Satellite Design" AIAA–94–1007–CP, pp. 707–715 R.C. Peach, F.Z. Bi and B. Van Osch COM DEV Ltd., Cambridge, Ontario, Canada.

SS/FDMA System or Digital Transmission "Application of Bandwidth–Variable SAW Filter Matrix for Efficient Interbeam Connection in Multibeam Satellite" H. Shinonaga and Y. Ito KDD R&D Laboratories Nakameguro 2–1–23, Meguro, Tokyo 153 Japan.

*Primary Examiner*—Thanh Cong Le

(74) *Attorney, Agent, or Firm*—Jones, Day, Reavis & Pogue

(57) ABSTRACT

A multi-beam DBS satellite system capable of providing spectrally efficient regional programming is disclosed. The inventive system includes at least one DBS satellite having a repeater connected between multiple uplink antennas and multiple downlink antennas. The repeater has a switching processor and a formatting processor. The switching processor includes circuitry for filtering individual channels of information from the uplink frequency division multiplexed (FDM) beams received at the uplink antennas, and also includes circuitry for switching the channels of information to form a set of switched channels. These switched channels are then combined and routed to the formatting processor. The formatting processor converts the switched FDM information into a combined digital TDM signal that preferably corresponds to the DVB standard. Using this repeater, the present invention is capable of linking different geographical sources of programming information to multiple downlink beams in a flexible and spectrally efficient manner for direct transmission to home receivers.

12 Claims, 6 Drawing Sheets

U.S. PATENT DOCUMENTS

| | | | | |
|---|---|---|---|---|
| 4,105,973 | A | | 8/1978 | Arnold et al. |
| 4,144,495 | A | | 3/1979 | Metzger |
| 4,228,401 | A | | 10/1980 | Wachs et al. |
| 4,381,562 | A | | 4/1983 | Acampora |
| 4,456,988 | A | | 6/1984 | Nakagome et al. |
| 4,491,947 | A | | 1/1985 | Frank |
| 4,509,198 | A | | 4/1985 | Nagatomi |
| 4,706,239 | A | | 11/1987 | Ito et al. |
| 4,722,083 | A | | 1/1988 | Tirro et al. |
| 4,813,036 | A | | 3/1989 | Whitehead |
| 4,858,225 | A | | 8/1989 | deSantis |
| 4,858,229 | A | | 8/1989 | Rosen et al. |
| 4,931,802 | A | | 6/1990 | Assal et al. |
| 5,033,108 | A | | 7/1991 | Lockwood |
| 5,068,813 | A | | 11/1991 | Thoen |
| 5,152,482 | A | | 10/1992 | Perkins et al. |
| 5,208,829 | A | | 5/1993 | Soleimani et al. |
| 5,233,609 | A | | 8/1993 | Hunton |
| 5,274,627 | A | | 12/1993 | De Santis |
| 5,303,286 | A | | 4/1994 | Weideman |
| 5,343,512 | A | | 8/1994 | Wang et al. |
| 5,355,512 | A | | 10/1994 | Profera, Jr. |
| 5,394,560 | A | | 2/1995 | Krane |
| 5,404,375 | A | | 4/1995 | Kroeger et al. |
| 5,408,515 | A | | 4/1995 | Bhagat et al. |
| 5,428,814 | A | | 6/1995 | Mort et al. |
| 5,506,904 | A | | 4/1996 | Sheldrick et al. |
| 5,563,892 | A | | 10/1996 | Kostreski et al. |
| 6,047,162 | A | * | 4/2000 | Lazaris-Brunner et al. ......................... 455/12.1 |

* cited by examiner

REGIONAL PROGRAMMING IN A DIRECT BROADCAST SATELLITE

This application is a division of U.S. Ser. No. 08/935,079, filed on Sep. 5, 1997 now U.S. Pat. No. 6,047,162.

BACKGROUND OF THE INVENTION

The present invention is directed toward the field of direct broadcast satellites ("DBS") also referred to in this application as direct-to-home ("DTH") satellites. In particular, a multi-beam DBS satellite is disclosed that is capable of providing regional as well as global programming in a flexible and spectrally efficient manner. Regional programming is provided by including on-board satellite circuitry for receiving, filtering, switching, combining and formatting numerous regional uplink channels that are included within beams of programming information transmitted from geographically widespread sources on the earth. By using the satellite disclosed herein, spectrally efficient regional programming can be carried out between multiple programming sources transmitting in multiple uplink beams and multiple receivers located in areas served by multiple downlink beams. The flexibility of the present invention is provided by the satellite's on-board switching processor that can connect any uplink signal to any downlink beam and can re-map the connectivity on-the-fly. The invention's spectral efficiency is provided, in part, by the use of multiple beams that can reuse the same uplink and downlink carrier frequencies, or that can use differing frequencies.

Prior art DTH satellites typically have one uplink beam and one downlink beam. These satellites employ a bent-pipe architecture, i.e., they simply receive, amplify and retransmit the uplink signal back to the ground. Since there is only one uplink signal, these satellites must gather all of the programming information at a central ground site ("the central hub"), where the collected programming is typically formatted into the Direct Video Broadcast ("DVB") standard and transmitted up to the transparent bent-pipe satellite. Such a satellite is typically in a geo-synchronous orbit so that its single downlink beam can cover the entire United States, for example.

The DVB standard multiplexes up to six video channels on to a 27.5 Mb/s bit stream. On-board the prior art DTH satellite, the uplink bandwidth is demultiplexed into the individual bit streams and amplified using an associated traveling wave tube ("TWT"). The amplified bit streams are then multiplexed and beamed back to earth over the single downlink beam.

The prior art DBS satellite systems suffer from several disadvantages. First, all of the programming carried by the system must be collected and formatted on the ground at the central hub. This is undesirable because it requires each of the programming sources to transmit its programming to the central hub by a dedicated connection, typically a leased high-bandwidth telephone line, or perhaps a satellite link, both of which can be very expensive to maintain and operate. Second, the prior art systems provide no efficient method of providing regional (or local) programming. The lack of local programming is considered to be the primary reason for lower than expected market penetration rates of DTH TV broadcasts and systems. Currently, DTH satellite subscribers must purchase an external antenna or basic cable-TV subscription in order to receive local programming. The present invention eliminates the need for these extra elements, providing the first complete programming solution for the DBS market. Third, the prior art satellites did not provide on-board connectivity nor did they provide flexible re-mapping of any type of on-board switching device. Therefore, reconfiguring the system to provide programming from several local sources, or combining local and global sources was difficult and expensive to configure. Because of these problems, the prior art systems only provided a set of static global sources of information and no regional programming.

Regional programming is theoretically feasible in the prior art one-beam system by combining the regional programming with the global programming at the central hub. However, because the satellite has only one downlink beam, it would be tremendously wasteful of available bandwidth to try and provide localized programming via the prior art DBS satellites. In effect, the regional programming would be transmitted as if it were global programming, since the prior art satellite has only a single downlink beam. The spectral inefficiency in such a system is obvious, and is precisely why such prior art satellites and DTH systems do not provide regional programming. Since the audience size for the regional programming is smaller, revenues will be smaller, and therefore the satellite operators would rather use the available bandwidth of the downlink beam for global programming. Further adding to the spectral inefficiency of the one beam to one beam system is the inability to reuse carrier frequencies. Since there is only one beam of information going to and from the satellite, the concept of reusing carrier frequencies is not even an option.

Another prior art DTH satellite system is the "Skyplex" system set forth in Canadian publication No. 2,184,123. Skyplex is designed for a single-beam system and provides limited on-board multiplexing and formatting of up to seven single-channel per carrier ("SCPC") sources sharing the bandwidth of a single uplink beam. This satellite design is able to gather video signals from geographically distributed sources, but only within a single uplink beam, not from multiple uplink beams. The satellite then multiplexes the individual channels into a multiple-channel per carrier ("MCPC") DVB format for downlinking over a single downlink beam to home receivers.

Although solving in part the prior art problems associated with routing all of the programming through a central hub, the Skyplex system is limited to a one-beam system and therefore does not provide a spectrally efficient or flexible means for regional programming. It does not provide a means for receiving and transmitting information in a multi-beam system, nor does it provide for flexible frequency reuse in a multi-beam system. It does not provide a mechanism for variable mapping of signals from any source beam to any destination beam or combination of destinations. It does not provide any type of on-board switching and filtering of channels in a multi-beam system, and it is incapable of on-the-fly re-mapping. These functions are desirable in a regional programming system and are not taught by the Skyplex reference.

Therefore, there remains a need in this art for a multi-beam satellite capable of providing spectrally efficient regional programming in a flexible manner.

There remains a more particular need for such a satellite having the ability to link together different geographic sources of information uplinked directly to the satellite in different uplink beams and to format these sources into a digital standard compatible with DTH satellite systems.

There remains a further need for such a satellite having the ability to map any uplink channel of information to any downlink beam in the multi-beam satellite, and to flexibly re-map the connectivity on-the-fly, without tremendous cost or complexity.

There remains another need in this art for a DTH satellite that is capable of receiving, switching, combining and formatting both global programming and regional programming in a bandwidth efficient manner.

There remains yet another need in this art for such a satellite that is capable of receiving uplink information from the conventional central-hub station, which transmits the global programming to the satellite, as well as receiving uplink information from numerous regional stations distributed throughout the geographic areas served by the satellite.

There remains a further need for such a satellite that can extract or filter the individual channels of uplink information from the global and regional programming, switch this information onto a set of downlink beams, and format the switched downlink information into a digital TDM broadcast standard, such as the DVB format.

There remains an additional need for such a satellite that includes a switching processor and a formatting processor, the switching processor for filtering and switching the incoming uplink channels of information from the regional stations and possibly from a central station, and the formatting processor for combining the switched channels and formatting them into a downlink beam according to a predetermined digital broadcast format.

SUMMARY OF THE INVENTION

The present invention overcomes the problems noted above and satisfies the needs in this field for a multi-beam DBS satellite capable of providing spectrally efficient regional audio or video programming from geographically distributed regional programming sources that transmit directly to the satellite. More particularly, the present invention provides a novel satellite architecture, including a repeater connected between multiple uplink antennas and multiple downlink antennas. The repeater has a switching processor and a formatting processor, referred to herein collectively as the "switching formatter." The switching processor includes circuitry for filtering individual channels of information from the uplink frequency division multiplexed ("FDM") beams received at the uplink antennas, and also includes circuitry for switching the channels of information to form a set of switched channels. These switched channels are then combined and routed to specific downlink beam paths within the formatting processor of the invention. The formatting processor converts the switched FDM channels of information into a combined digital TDM signal that preferably corresponds to the DVB standard. The repeater also includes an input multiplexer ("IMUX") for receiving a global programming signal from a central hub station and for segmenting the FDM global bandwidth into smaller sub-bands. These sub-bands are amplified using TWTs and are then combined into a downlink FDM beam by a plurality of output multiplexers ("OMUX"). The switched TDM bands from the switching formatter are also amplified by TWTs and combined with the global sub-bands at the inputs of each OMUX to form the downlink beams.

According to the satellite of the present invention, spectrally efficient regional programming can be carried out by directly beaming the regional programming from geographically distributed regional stations to the multi-beam DBS satellite, which links the uplink information to numerous other geographic areas served by its downlink beam patterns. Global programming can still be provided from the central hub, as known in the prior art.

The repeater disclosed in this application enables the combination of global and regional programming in a flexible and spectrally efficient manner previously unknown to the prior art. In addition, the repeater enables intelligent routing of regional programming to appropriate downlink beams that service areas that would likely respond to the specific regional programming information. The spectral efficiency of the invention is achieved, in part, through the use of multiple beams that can share some or all of the same uplink and downlink beam width. This technique of sharing the available carrier frequencies is known as frequency reuse, and is only possible in a multi-beam configuration.

The following example demonstrates the functionality of the present invention. A sporting event is taking place between two teams that are located in cities on the west coast of the United States. During the regular season this program is most likely of interest only to viewers that are within the downlink beam(s) covering the western United States—i.e. it is a regional program. But, if this is a playoff game, or a bowl game, it may be desirable to provide national or at least super-regional coverage for the event. Prior art satellites are incapable of dealing with these varying programming situations. The present invention, by distinction, can deal with both scenarios by programming the inventive satellite to filter, switch, route, combine and format the incoming regional programming signal from the west coast location to the proper downlink beams to match the coverage requirements.

In both cases, the regional program is broadcast from a west coast regional programming station, directly to the DBS satellite, where it is combined with other sources of information, such as global programming from the central hub, or other regional programming. For the regular season game, the combined signals are then routed only to a downlink beam that is servicing the west coast, thus conserving the downlink bandwidth of the satellite. For the playoff game, the inventive satellite is reprogrammed to route and combine the regional uplink channel carrying the sporting event to all of the downlink beams in the multi-beam satellite. This example demonstrates the flexibility and spectral efficiency of the present invention.

In the preferred embodiments of the present invention set forth in this application, the switching processor utilizes analog circuitry to carry out the filtering and switching functions, and the formatting processor uses digital circuitry. In these embodiments the two processors are referred to collectively as the "analog/digital switching formatter." Alternatively, but not shown in detail in the drawing figures, the analog switching processor could be constructed using digital circuitry. In this alternative all-digital embodiment, digital frequency demultiplexers are used for the filtering function and a digital switch is used for the switching function.

The present invention provides many advantages over the prior art: (1) it provides a multi-beam DTH satellite system capable of transmitting and combining global programming through a central hub station and regional programming directly through the satellite, the regional programming being transmitted from various regional programming stations distributed in numerous and dispersed geographic locations; (2) it provides a satellite repeater having conventional multi-beam satellite circuitry for transmitting the global programming and an unconventional switching formatter for filtering, switching, combining and formatting the regional programming; (3) it provides a satellite repeater that receives multiple FDMA uplink beams from various sources, extracts sub-bands (or groups of channels of information) from the FDMA uplink beams, switches the extracted channels of information, combines the switched FDMA channels, converts the FDMA signals into a TDM signal, and formats the TDM signal into the DVB standard; (4) it provides the ability to map any uplink channel from either a global hub station or from a regional programming station to any downlink beam, and provides on-the-fly re-mapping of the signals; (5) it provides for direct distribution of programming information from the regional programming stations to the DTH satellite, without having to support a costly leased line to the central hub station; (6) it provides a beam-to-beam channel switching processor that enables flexible, bandwidth-efficient and cost-effective regional connectivity from the multiple uplink beams to the multiple downlink beams; and (7) it provides a spectrally efficient implementation by providing multiple uplink and downlink beams that can re-use some or all of the same carrier frequencies.

There are just some of the many advantages provided by the present invention, described illustratively in more detail below. As will be appreciated, the invention described in the attached drawings is capable of other and different embodiments, and its several details are capable of modifications in various respects, all without departing from the spirit of the invention. Accordingly, the drawings and description of the preferred embodiments are to be regarded as exemplary in nature and not restrictive.

BRIEF DESCRIPTION OF THE DRAWINGS

The present invention satisfies the needs noted above, and provides the enumerated advantages, as well as many other advances, as will become apparent from the following description when read in conjunction with the accompanying drawings wherein.

DETAILED DESCRIPTION OF THE DRAWINGS

Figure 1:
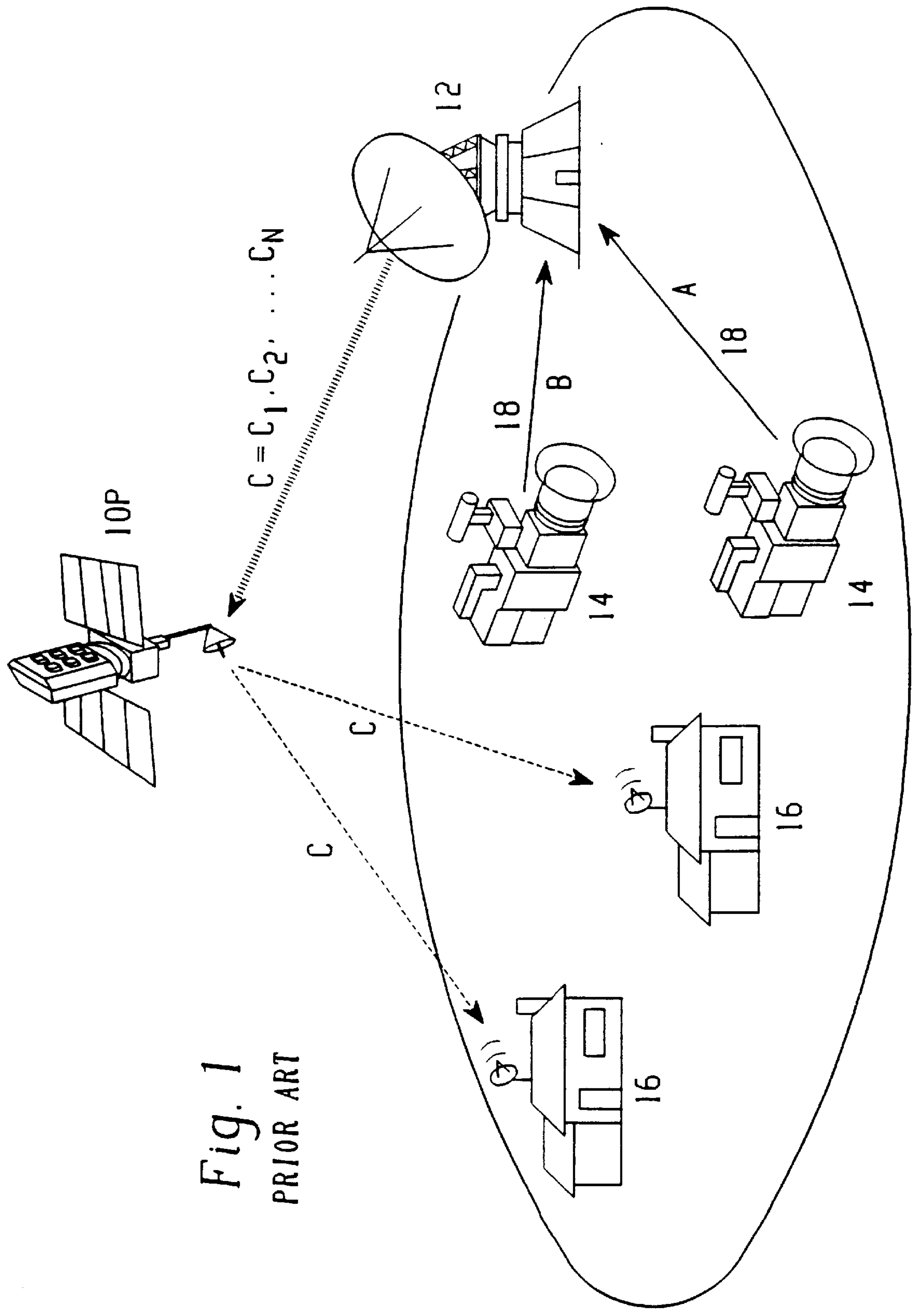
Fig. 1 PRIOR ART
FIG. 1 is a diagram of the prior art DTH satellite system where all of the programming information is distributed through the central hub station.

Referring now to the drawings, FIG. 1 sets forth a diagram of a prior art DTH satellite system where all of the programming is transmitted though the central hub 12. In the prior art DTH satellite system various programming sources 14 transmit their programs to a central hub station 12 using conventional land-lines 18, which could be fiber optic lines, high-bandwidth telephone connections, or satellite connections. The central hub station 12 collects the various sources of programming information, shown in the figure as A and B, multiplexes this information together, and puts the multiplexed information into a digital TDM standard, such as the DVB format. According to the DVB standard, up to six channels of information can be multiplexed onto a 27.5 Mb/s bit stream. This global information beam C, which includes many digital bit streams of information, labeled as $C_1$, $C_2$, . . . $C_N$ is then uplinked to a satellite 10P.

The prior art DTH satellite 10P is in geosynchronous orbit about the earth and includes conventional bent-pipe circuitry such as IMUX, OMUX, and TWT amplifiers. The transparent, bent-pipe architecture of the prior art DTH satellite 10P means that it does not demodulate or regenerate the baseband signals on-board the satellite, nor does it provide any type of switching mechanism. On-board the prior art satellite 10P, the uplink global bandwidth C is demultiplexed by an IMUX into the individual bit streams $C_1$, $C_2$, . . . $C_N$. Each bit stream is amplified by a TWT amplifier and the amplified bit streams are multiplexed together using the OMUX and transmitted back to the ground.

The global programming signal C is received directly by home users 16 having small satellite dish antennas mounted in line-of-sight of the satellite 10P. As seen in FIG. 1, the prior art one-beam uplink to one-beam downlink system is inappropriate for regional programming applications. Because the satellite 10P has a single downlink beam, any regional programming is in reality global programming since the satellite 10P provides no mechanism for beaming information to different spots on the ground. Even if satellite 10P were a multi-beam satellite, with multiple uplink and downlink beams covering different spots on the Earth, the prior art DTH satellite 10P provides no mechanism for switching, routing, combining and formatting the various regional programming beams and therefore cannot provide spectrally efficient regional programming with flexible connectivity from beam to beam.

Figure 2:
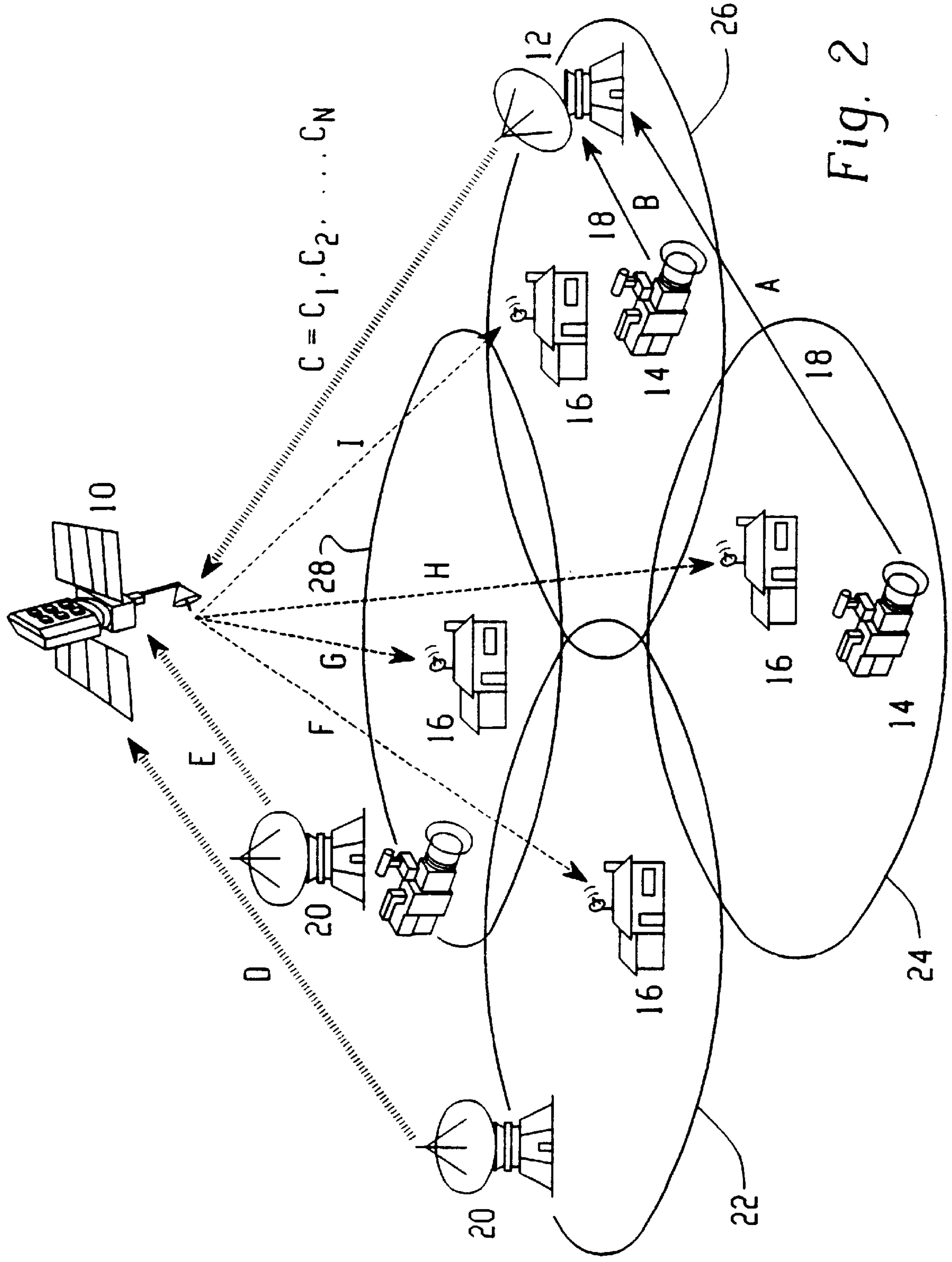
FIG. 2 is a diagram of a system according to the present invention including a multi-beam satellite repeater capable of directly receiving multiple programming signals from geographically distributed regional programming stations as well as a central hub, and capable of efficiently combining these information sources and transmitting the combined information back to earth, thus providing spectrally efficient regional programming.

Turning now to the present invention, FIG. 2 sets forth a system diagram of a DTH satellite network capable of providing spectrally efficient regional programming. As in the prior art DTH system, various programming sources 14 transmit global programming A, B to the central hub station 12 using land-lines 18. This global programming is multiplexed and converted to the DVB standard at the central hub station 12 prior to being beamed up to the inventive satellite 10 as combined bit stream C. As will be described more fully below in connection with FIGS. 3–5, satellite 10 is a multi-beam regenerative satellite having circuitry that enables the satellite to link multiple regional programming sources, and global sources, on-board the satellite, and to format and direct the combined information back to the ground using a plurality of downlink beams. Although not shown in FIG. 2, alternatively, the uplink beams or the downlink beams could be inter-satellite links to other DBS satellites 10 that, together, form a constellation of satellites.

The downlink beams service a spot or area on the earth, which may overlap to form a grid of programming areas 22, 24, 26 and 28. Each of the downlink spots 22, 24, 26, and 28 are referred to herein as "regions," and within each region there are a plurality of home receivers 16 that are desirous of receiving both global programming C from the central hub station 12 and regional programming generated from within their own local region, or perhaps from neighboring regions. Because the present invention utilizes a satellite having multiple uplink and downlink beams, the individual carrier channels that make up the overall bandwidth of the satellite can be reused in more than one beam—i.e. more than one uplink or downlink beam can be communicating via the same carrier frequency. By reusing the carrier frequencies in more than one beam, the satellite 10 is more spectrally efficient than the prior art one beam satellites 10P that are incapable of frequency reuse.

Also shown in FIG. 2 are regional programming sources 20, located, for example, in spots 22 and 28. There could be more than one regional programming source in each region. These regional programming sources 20 could be, for example, the local news and sports broadcasts that are of interest to receivers 16 within those regions. The regional programming sources 20 generate regional programming signals D, E, which are preferably FDM signals broadcast in the DVB format. The regional programming signals D, E may be a single channel of information, or could be multiple channels that are multiplexed and formatted at the regional programming source 20, just as the global signals A, B are multiplexed and formatted at the central hub station 12 to form global uplink C.

On board the inventive satellite 10, the global programming beam C and the regional programming beams D, E are linked to one or more downlink beams that service the regions 22, 24, 26, 28 served by the satellite 10. These downlink beams are labeled as F, G, H, and I, and are preferably FDM signals having multiple bit streams formatted in the DVB standard. Downlink beam F, for example, could include both the global programming signal C and the regional programming signal D that is broadcast from the regional programming center 20 located in region 22. Beam F could also include the regional programming from uplink beam E, since region 28 is overlapping with region 22, and therefore receivers 16 in region 22 may also be desirous of receiving the regional programming from region 28. Likewise, beams G, H and I could include all or at least a portion of the global programming information C, and may also include regional programming uplinked to the satellite 10 from the corresponding region 28, 24 and 26, or could include regional programming from other regions as well.

An example noted above is the situation where a sporting event is taking place in a particular area, say region 22. This sporting event is captured on-site and is beamed directly up to the satellite 10 by regional programming station 20, which could be a mobile satellite uplink truck or could be the stationary transmitter associated with the local station nearby the game. This signal D is directly uplinked to the satellite 10, and therefore does not have to be transmitted to the central hub station 12 for distribution. If the game is a regular season game, it may only be of interest to receivers 16 in region 22. In this situation, the inventive satellite 10 is programmed to only route the uplink beam D only to downlink beam F, so as not to waste the global bandwidth of the satellite. But, if the game is a playoff game, and therefore of wider interest, the uplink beam D from the game can be routed by the satellite to any or all of the downlink beams F, G, H and I. This is a key advantage of the present invention: the ability to map any uplink beam from any region to any and all downlink beams, and to re-map the connectivity, on-the-fly, in response to the likely viewers of the programming. This flexible, spectrally efficient connectivity between the uplink and downlink signals is unknown in the prior art.

In order to provide the functionality described in FIG. 2, a satellite repeater is required that is capable of filtering uplink channels of regional programming, switching the channels to appropriate downlink beams, and formatting the switched channels into a digital TDM standard, such as the DVB standard. In addition, the satellite should be able to route and combine global programming from a central hub station with the regional programming signals that are beamed directly to the satellite. Such an inventive satellite is capable of providing spectrally efficient regional programming from a plurality of geographically dispersed regional programming sources to a plurality of receivers in multiple spot beams, and is described below in FIGS. 3–5.

Figure 3:
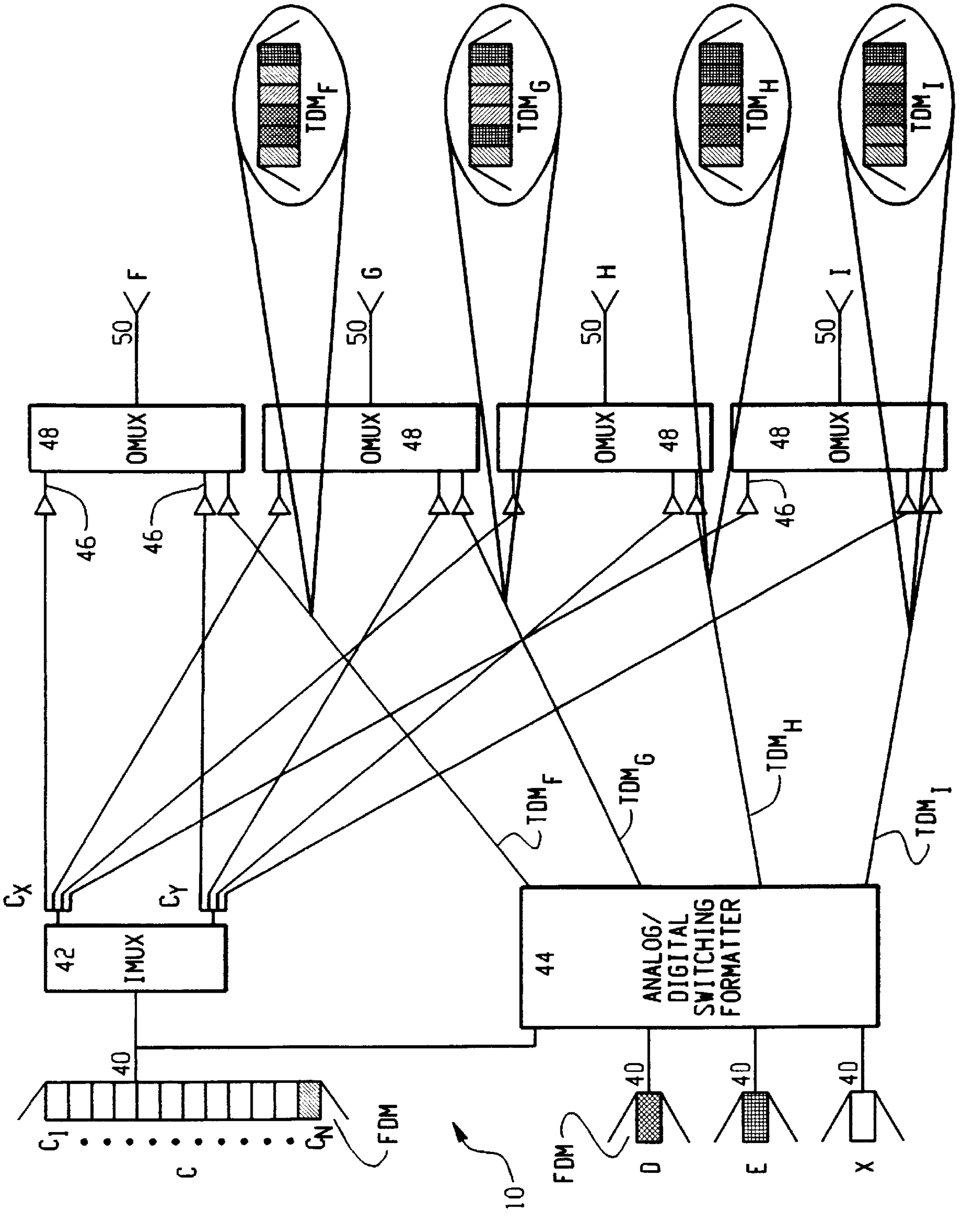
FIG. 3 is a basic block diagram of a multi-beam satellite repeater according to the present invention.

Turning now to FIG. 3, an exemplary satellite repeater architecture according to the present invention is set forth. The satellite 10 has multiple uplink receiving circuits 40 (which generally include antennas, receivers, etc.) and multiple downlink transmitting circuits 50 (which generally include antennas, transmitters, etc.) Thus, satellite 10 is a multi-beam satellite. Connected to one of the receiving circuits 40 is an input multiplexer 42 that segments the spectrum of the incoming FDM global programming beam C into sub-bands of information Cx, Cy. These sub-bands (only two are shown for illustrative purposes, but there could be more) are routed to amplification circuits 46, which are preferably TWT amplifiers, but could, alternatively be any other type of appropriate amplifier. The amplified sub-bands are reconstituted by at least one output multiplexer 48 into beams of information and are transmitted back to the ground by an associated downlink transmission circuit 50.

Also included in the satellite 10 is a special-purpose analog/digital switching formatter 44 that is connected to a plurality of receiving circuits 40 that receive a plurality of beams D, E, . . . X, and, as shown, it may also be connected to global beam C. Beams D, E, . . . X represent FDM regional programming signals beamed directly to the satellite 10 from the regional programming stations 20 located in various geographic locations on the ground. The beams are labeled D, E, . . . X to indicate that there can be numerous such beams, the total number depending upon the number of uplink beams available on the satellite. As described above, each uplink beam generally includes many individual channels of video or audio information.

The switching formatter 44 extracts the individual channels of information from the incoming FDM beams, switches the individual channels to form a set of switched channels, combines the switched channels that are destined for a particular downlink beam F, G, H, and I, and formats the collected channels (or sub-bands) into a digital TDM format, preferably the DVB format. These functions are accomplished using an analog processor and a digital processor, which are described more fully below in connection with FIGS. 4 and 5. (As noted above, the analog processor functions could alternatively be provided using digital circuitry, in which case the switching formatter 44 would be an all-digital processor.) The switching function is preferably carried out using a programmable switch matrix that can be reprogrammed on-the-fly from a ground controlling station, thereby enabling the flexible mapping and re-mapping of any uplink channel to any downlink beam.

The analog portion of the switching formatter 44 filters (or extracts) the individual FDM channels of information from the uplink beams C, D, E, . . . X and switches the channels to form a set of switched channels. These switched channels are then combined and formatted by the digital portion of the switching formatter 44 into a TDM signal in the DVB format. The output sub-bands from the switching formatter 44, labeled $TDM_F$, $TDM_G$, $TDM_H$, $TDM_I$ (one sub-band corresponding to each downlink beam F, G, H I) are then routed to TWT amplifiers 46, in the same manner as the global programming sub-bands Cx, Cy. The output multiplexers 48 combine the sub-bands of global programming Cx, Cy with the switched and formatted sub-bands of regional programming from the analog/digital switching formatter 44 to form the downlink beams F, G, H and I that are transmitted back to the ground via transmitting circuits 50.

Using the architecture shown in FIG. 3, a multi-beam satellite system can be constructed that is capable of transmitting global programming from a central hub station, and at the same time linking multiple regional programming sources to multiple downlink beams without having to transmit the regional programming to the central hub station, thus overcoming the problems noted in the prior art DTH systems. In addition, because the satellite 10 incorporates individual channel extraction and switching functions via the switching formatter 44, the multi-beam satellite system can flexibly map any input uplink channel to any downlink beam, thereby directly linking multiple regional programming sources to receivers located in multiple spot locations. Also, the switching formatter 44 can be re-mapped, on-the-fly via the programmable switch matrix, thereby enabling efficient and cost-effective reprogramming of the regional programming content of any beam in the system.

Although FIG. 3 shows one input multiplexer 42 connected to a single global programming beam C, there could be more than one IMUX for receiving more than one uplink global beam. Likewise, the present invention shows three uplink regional programming beams D, E, . . . X and four downlink beams F, G, H and I. Again, this is shown for illustrative purposes only. There could be any number of regional uplink signals and any number of downlink beams. In fact, the more uplink and downlink beams, the better the present invention operates, since it can provide finer granularity and routing of regional programming to only those downlink beams where it makes sense to route the programming, i.e., where an audience for the particular regional programming exists.

Figure 4A:
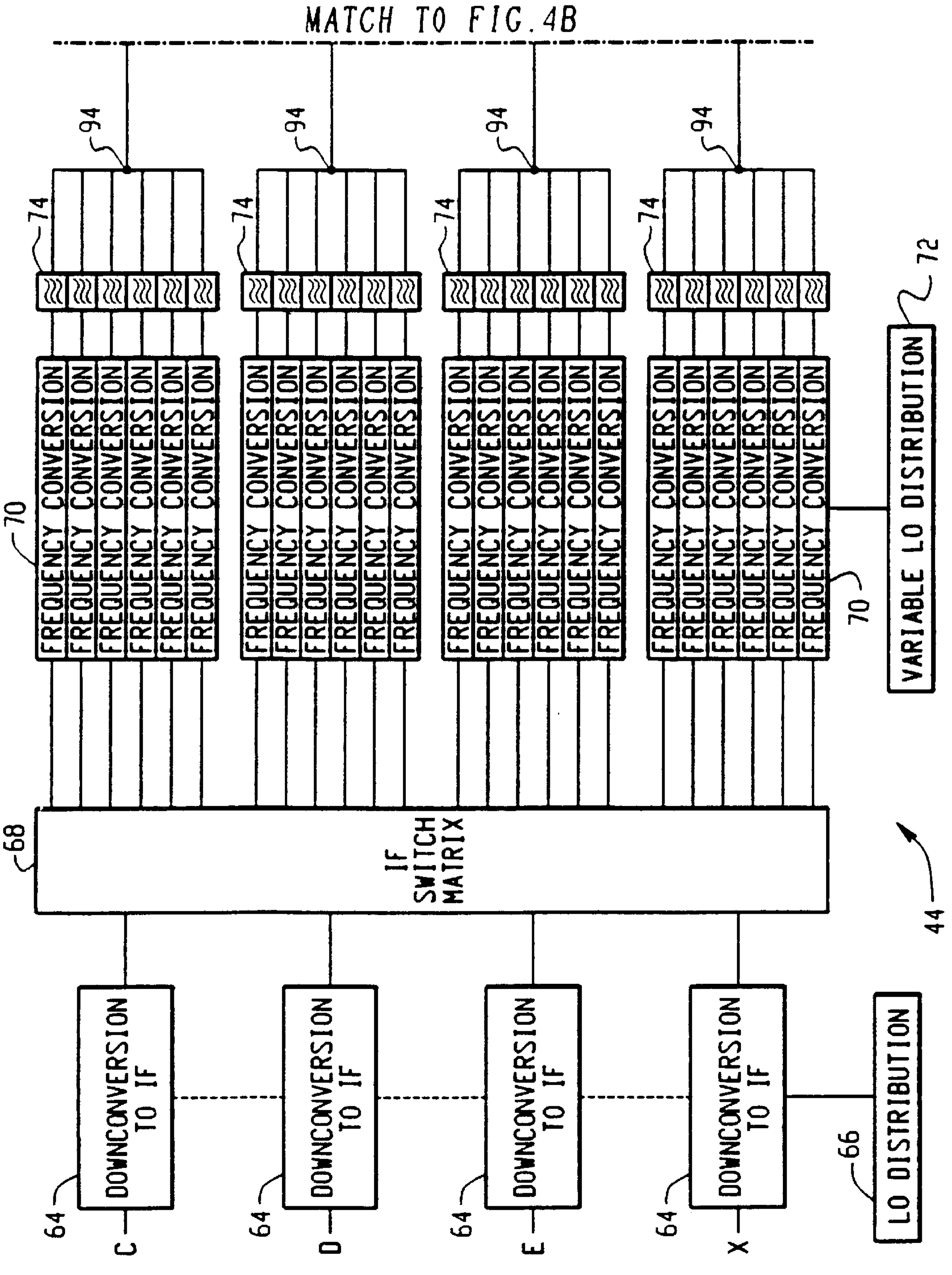
FIG. 4 is a more detailed block diagram of a preferred analog/digital processor portion of the satellite repeater that provides the functionality to enable spectrally efficient regional and flexible regional programming.
Figure 4B:
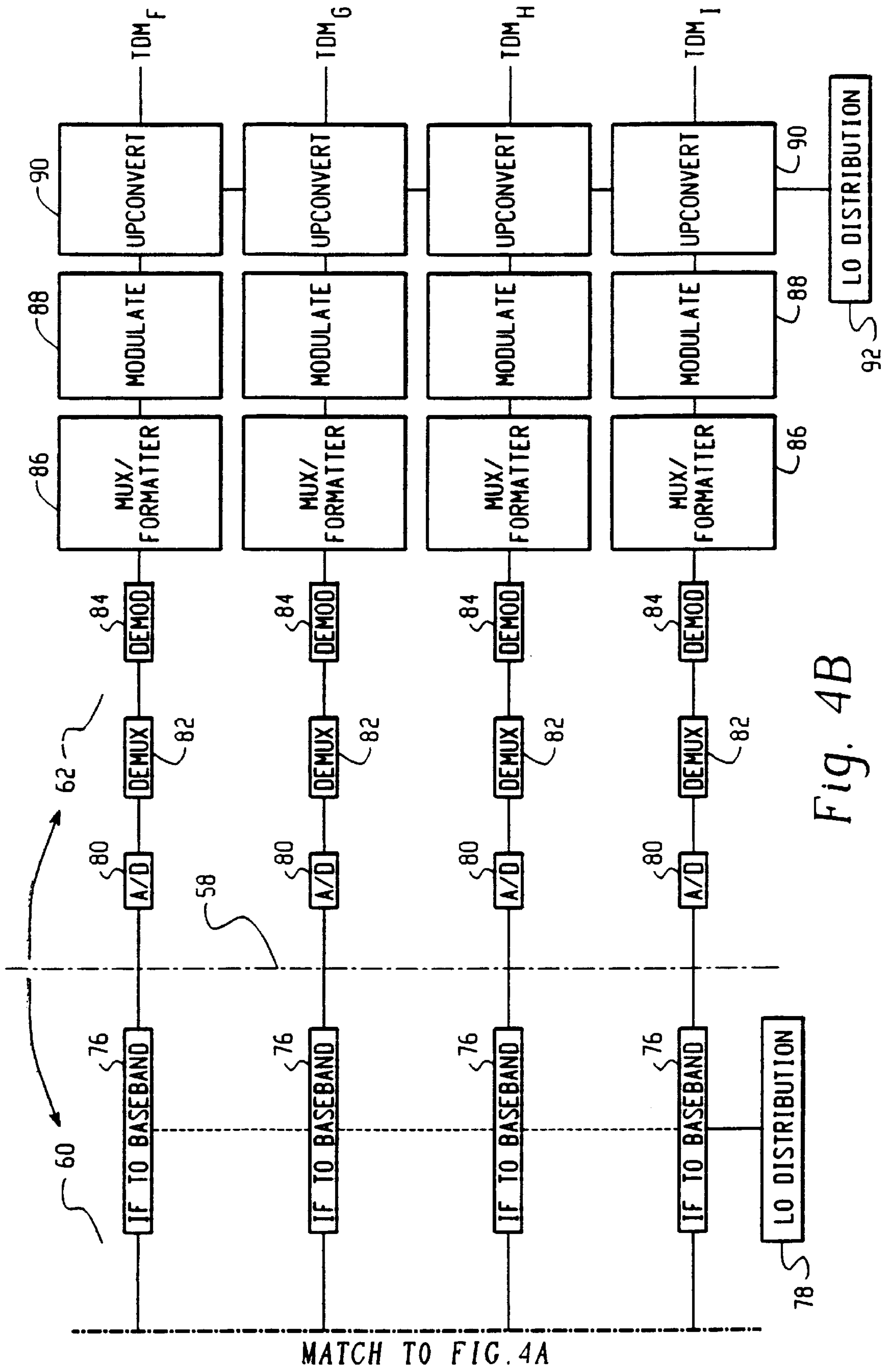
Figure 5:
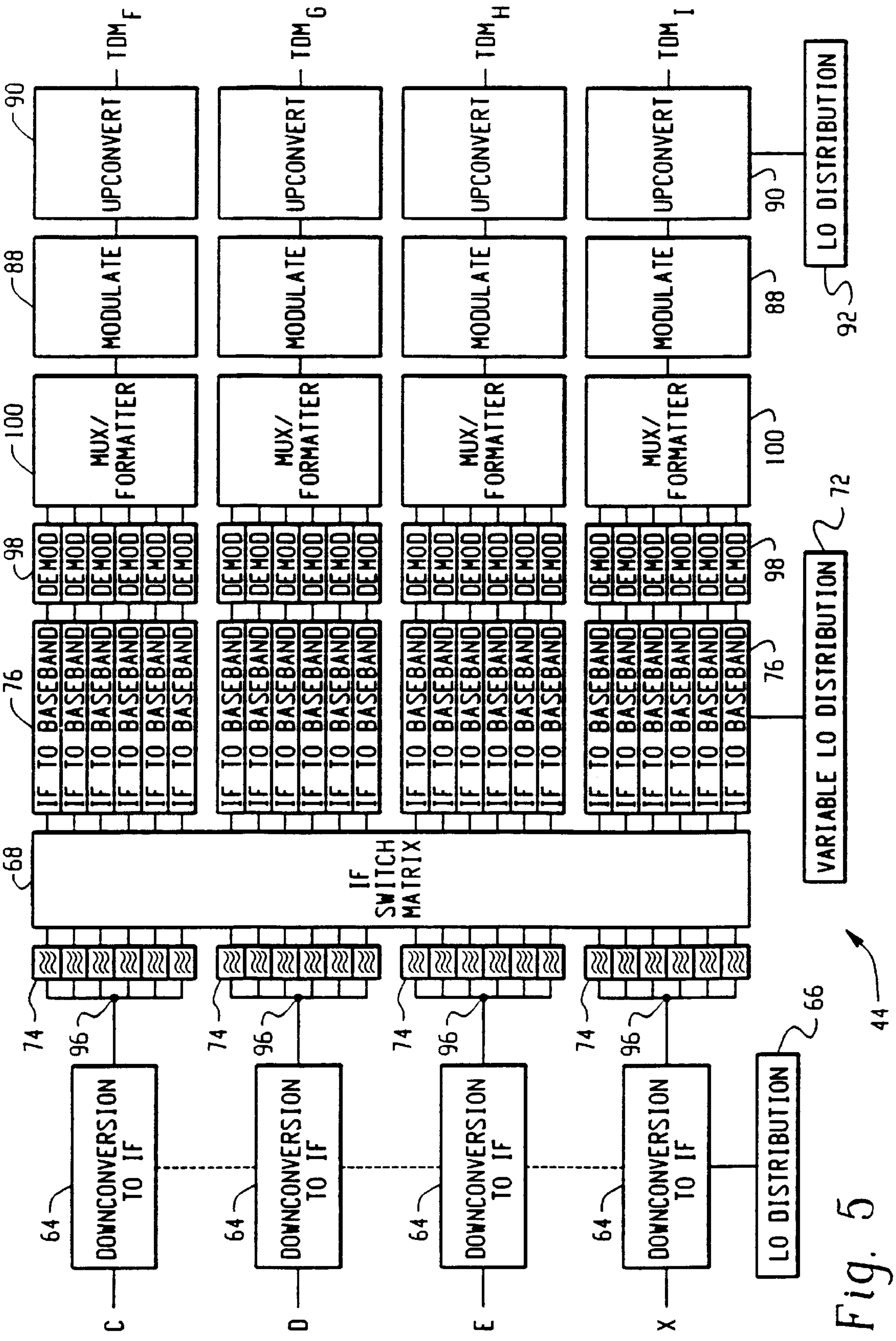
FIG. 5 is an alternatively embodiment of an analog/digital processor portion of the inventive satellite repeater.

FIGS. 4 and 5 set forth two embodiments of the analog/digital switching formatter 44 included in the satellite 10 of the present invention. FIG. 4 is the preferred embodiment and FIG. 5 is an alternative embodiment. FIG. 4 shows that the analog/digital switching formatter 44 is comprised of two sections, the analog front-end processor 60, and the digital back-end processor 62. The separation line 58 provides a breakpoint where the analog processor 60 connects to the digital processor 62.

The analog portion 60 of the switching formatter 44 extracts channels of information from the regional programming beams D, E, . . . X (and possibly global beam C if it is routed to the switching formatter) using banks of surface-acoustic-wave ("SAW") filters 74 and switches the extracted channels using a programmable switching matrix 68. There are at least two ways of switching and extracting the channels. In one configuration, shown in FIG. 4, the beams of information are switched first, and then the switched beam is positioned within the bandwidth of the SAW filter to extract the particular channel of interest. In a second configuration, shown in FIG. 5, the channels are extracted first using the SAW filters 74 and then the extracted channels are switched via the programmable switching matrix 68. There could be other configurations for extracting and switching the channels, all of which are within the scope of the invention. For example, the analog front-end processor 60 could, alternatively, be replaced by a digital front-end processor. In this embodiment the extraction function is provided using digital frequency demultiplexers, and the switching function is provided using a digital switch.

The digital portion 62 of the switching formatter 44 combines the switched channels of information from the analog processor 60 into sub-bands of programming, and then converts the sub-bands into a digital TDM format, preferably the DVB format. The outputs of the digital portion 62 are the TDM modulated sub-bands $TDM_F$, $TDM_G$, $TDM_H$, $TDM_I$, which are routed to the TWTs 46 and OMUX circuits 48 for amplification and frequency division multiplexing with the global programming sub-bands Cx, Cy.

There are at least two ways of combining and converting the switched channels from the analog processor 62. FIG. 4 shows one configuration, where the switched and extracted channels have been combined (in an analog fashion) by a power combiner 94 prior to feeding the digital processor 62. This embodiment is preferred since it minimizes the number of subsequent digital demodulation chains. In this configuration, the digital processor 62 first converts the combined analog channels into a digital format using an analog to digital converter (A/D) 80, and then demultiplexes and demodulates the individual channels using a demultiplexer (demux) 80 and a demodulator (demod) 84 prior to recombining and formatting the channels using a MUX/formatter 86. The MUX/formatter 86 combines the digital channels into a TDM format such as the DVB standard. An example of such a MUX/formatter 86 is disclosed in the Skyplex Canadian publication noted in the background of the invention section of this application.

Another configuration for the digital processor 62 is set forth in FIG. 5. In this configuration, the channels are not combined by an analog power combiner 94, so more demodulation chains are required. The channels are demodulated and then fed to a MUX/formatter 100, which is to Mux/formatter 86 except it has a plurality of incoming demodulated channels instead of a single incoming demodulated sub-band of channels. The function of MUX/formatter 100 is the same as MUX/formatter 86—to combine the demodulated channels of information and convert them into the TDM format. There could be other configurations for combining and formatting the channels, all of which are within the scope of the invention.

Turning more specifically to the preferred embodiment shown in FIG. 4, the analog portion of the analog/digital switching formatter 44 includes a plurality of downconverters 64, a programmable IF switching matrix 68, a plurality of frequency converters 70, banks of SAW filters 74, a plurality of power combiners 94, and a plurality of IF to baseband converters 76. Also included are associated local oscillators 66, 72 and 78, that feed the frequency converters, which are typically mixer circuits in order to provide the desired level of frequency conversion.

The digital portion of the analog/digital switching formatter 44 includes a plurality of digital processing chains, one chain for each sub-band of analog channels generated by the analog processor 60. Each chain includes an analog to digital converter 80, a demultiplexer 82, a MUX/formatter 86, a modulator 88 and an upconverter 90. Also included is a local oscillator 92 that feeds the appropriate upconversion frequency to the upconverter 90 so that the switched, formatted TDM sub-bands are at the desired downlink frequency.

Functionally, the analog/digital switching formatter 44 shown in FIG. 4 operates as follows. The regional programming beams of information D, E, . . . X, (and perhaps the global beam C) are first downconverted to an intermediate frequency using downconverters 64. These downconverters are preferably mixer circuits that mix the incoming beam carrier frequency with the frequency from a local oscillator 66, thereby downconverting the incoming beams of information as is well-known in this art. The downconverted beams of regional programming are then fed to the programmable IF switch matrix 68 which is capable of switching each of the individual beams to many outputs. Each output of the switch matrix 68 is then routed to a frequency converter 70, which is preferably a mixer. The frequency converters 70 are also fed a variable local oscillator signal from a plurality of local oscillators 72, each local oscillator providing a translation frequency that corresponds to a subsequent SAW filter 74 connected to the output of the respective frequency converter 70. Using this circuitry 70, 72 and 74, the individual channel of interest can be extracted from the switched regional programming beam by translating the frequency of the beam so that the channel of interest is within the bandpass of the SAW filter 74. The extracted channels of information are then combined, in a non-overlapping analog fashion by power combiners 94. Since each SAW filter 74 in a given bank will preferably have a different center frequency, there should be no overlap of information when the signals are combined by the power combiner 94. The combined channels (or sub-band) of regional programming are then downconverted to baseband using IF to baseband mixers 76 and local oscillator 78 before being communicated to the digital portion of the invention.

The sub-bands of switched regional programming are each routed to a digital processing chain, there being one chain for each downlink beam in the satellite. In the example system shown in FIGS. 3–5, there are four downlink beams and four uplink beams, hence the analog/digital switching formatter 44 has four digital processing chains. The digital processing chain first converts the analog sub-band of regional programming information into a digital form using an A/D converter 80. The digitized sub-band is then demultiplexed back into individual channels of information using the digital demultiplexer 82. This demultiplexed signal is then demodulated by digital demodulator 84 in order to extract the information content of the individual channel. The digital demodulator 84 is preferably a time-shared demodulator. The demodulated channels are then fed to the MUX/formatter 86, which recombines the channels into a packetized TDM signal (i.e., FDM to TDM conversion) that is preferably in the DVB format. Following this step, the newly reconstituted TDM sub-band is then modulated into an analog signal by modulator 88, and is then unconverted by upconverter 90 and associated local oscillator 92 in order to convert the sub-band of TDM regional channels into an appropriate downlink frequency.

Turning now to FIG. 5, an alternative embodiment of the analog/digital switching formatter 44 is shown. This embodiment employs many of the same circuit elements as FIG. 4, so their functionality will not be described again. This embodiment differs from FIG. 4, in that in FIG. 4 certain sets of switched channels were combined prior to digital processing in order to minimize subsequent digital hardware, whereas in FIG. 5, each channel of switched regional programming is individually demodulated by the digital processor 62, which therefore requires more demodulator circuits 98 than those 84 set forth in FIG. 4.

Like FIG. 4, the regional programming beams D, E, . . . X, (and maybe the global programming beam C) are first downconverted to IF by downconverters 64 and local oscillator 66. These downconverted beams are then split using a plurality of power splitters 96 (which route the one input to many outputs) and the individual channels or carriers are extracted using banks of SAW filters 74. The channels are then switched onto appropriate downlink beam paths using the programmable IF switch matrix 68 as described above. The switched channels are then downconverted to baseband using IF to baseband mixers 76 and a plurality of variable local oscillators 72. Note that the variable local oscillators 72 are used with the IF-to-baseband converters 76 in FIG. 5 since the output switched channels will be at different carrier frequencies, whereas in FIG. 4 only a single local oscillator is required to convert from IF to baseband since the operation of the frequency converters 70 and SAW filters 74 results in the extracted channels being at the same carrier frequency.

The switched channels are then individually demodulated by demodulator 98 and are then routed to a MUX/formatter 100, which operates to combine the channels into a regional sub-band and format the sub-band to the DVB digital TDM standard, as described above. The formatted sub-band is then converted into an analog signal by modulator 88 and upconverted to an appropriate downlink frequency by upconverter 90 and local oscillator 92. As described previously, the sub-bands of TDM-formatted regional programming information are then amplified and combined with the global programming sub-bands at the OMUX and transmitted back to the ground by one of the multi-beam downlink antennas.

Having described in detail the preferred embodiments of the present invention, including its preferred modes of operation, it is to be understood that this operation could be carried out with different elements and steps. This preferred embodiment is presented only by way of example and is not meant to limit the scope of the present invention which is defined by the following claims.

What is claimed:

1. A method of providing regional programming in a direct broadcast satellite (DBS) system having at least one multi-beam DBS satellite, the DBS satellite having circuitry for receiving a plurality of uplink beams and for transmitting a plurality of downlink beams, the method comprising the steps of:

transmitting a plurality of regional programming beams from regional programming stations directly to the DBS satellite, each regional programming beam including channels of regional programming information;

filtering the channels of regional programming information from each regional beam;

switching the regional programming channels;

combining the switched regional programming channels into sub-bands of regional programming information, each sub-band being routed to a particular downlink beam; and formatting the sub-bands of regional programming information into a digital TDM format for downlinking via the plurality of downlink beams.

2. The method of claim 1, further comprising the steps of:

transmitting at least one global programming beam from a central hub station to the DBS satellite;

segmenting the global programming beam into a plurality of sub-bands of global programming information; and combining the global sub-bands with the regional sub-bands prior to downlinking via the plurality of downlink beams.

3. The method of claim 1, wherein the digital TDM format is the DVB format.

4. A direct broadcast satellite (DBS) system for providing regional programming, including at least one multi-beam DBS satellite, the at least one DBS satellite having circuitry for receiving a plurality of uplink beams and for transmitting a plurality of downlink beams, the system comprising:

means for transmitting regional programming beams from regional programming stations directly to the at least one DBS satellite, each regional programming beam including at least one channel of regional programming information;

means for filtering the channels of regional programming information from each regional beam;

means for switching the regional programming channels; and means for formatting the switched regional programming channels into a digital TDM format for downlinking via the plurality of downlink beams.

5. The system of claim 4, further comprising:

means for combining the switched regional programming channels into sub-bands of regional programming information, each sub-band being routed to a particular downlink beam after being formatted into the digital TDM format by the means for formatting.

6. The system of claim 4, further including a plurality of multi-beam DBS satellites, wherein at least two of the plurality of multi-beam DBS satellites are connected by an inter-satellite link.

7. The system of claim 6, wherein the plurality of multi-beam DBS satellites form a constellation of satellites having a plurality of inter-satellite links that connect the plurality of multi-beam DBS satellites.

8. A method of providing regional programming in a direct broadcast satellite (DBS) system, comprising:

transmitting a plurality of regional programming beams of information from regional programming sources directly to a multi-beam DBS satellite, the regional programming beams including channels of regional programming information;

extracting the channels of information from the regional programming beams;

mapping the regional channels of information to a plurality of downlink beams; and formatting the mapped regional channels into a digital TDM format.

9. The method of claim 8, further including the step of re-mapping the regional channels to different downlink beams.

10. The method of claim 8, further including the steps of:

transmitting at least one global programming beam of information from a central hub station directly to the DBS satellite;

combining the global programming information with the formatted mapped regional channels; and downlinking the combined information to the ground via the plurality of downlink beams.

11. The method of claim 10, further including the step of:

combining the mapped regional channels into sub-bands of regional programming information prior to formatting.

12. The method of claim 10, further including the steps of:

transmitting at least one global programming beam of information from a central hub station directly to the DBS satellite;

segmenting sub-bands of global information from the global beam;

amplifying the global sub-bands and the regional sub-bands; and combining the amplified global and regional sub-bands to form downlink beams for transmission back to the ground.

* * * * *

UNITED STATES PATENT AND TRADEMARK OFFICE

CERTIFICATE OF CORRECTION

PATENT NO. : 6,498,922 B1 
DATED : December 24, 2002
INVENTOR(S) : Lazaris-Brunner et al.

It is certified that error appears in the above-identified patent and that said Letters Patent is hereby corrected as shown below:

Title page,
Item [62], Related U.S. Application Data, should read:
-- Division of application No. 08/935,079, filed on Sep. 25, 1997, now Pat. No. 6,047,121. --

Signed and Sealed this

Third Day of June, 2003

JAMES E. ROGAN
*Director of the United States Patent and Trademark Office*